(12) United States Patent
Hendrix et al.

(10) Patent No.: US 6,310,790 B1
(45) Date of Patent: Oct. 30, 2001

(54) HIGH FREQUENCY DC-DC DOWN CONVERTER WITH POWER FEEDBACK FOR IMPROVED POWER FACTOR

(75) Inventors: Machiel A. M. Hendrix; Darko Antic, both of Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/557,598

(22) Filed: Apr. 25, 2000

(30) Foreign Application Priority Data

Apr. 28, 1999 (EP) .................................................. 99201311

(51) Int. Cl.[7] .................................................. H02M 7/217
(52) U.S. Cl. .................................................. 363/84; 363/89
(58) Field of Search .................................. 363/34, 37, 84, 363/89

(56) References Cited

U.S. PATENT DOCUMENTS

| | | | | |
|---|---|---|---|---|
| 4,996,462 | * | 2/1991 | Krummel | 315/209 R |
| 5,068,572 | * | 11/1991 | Blankers | 315/209 R |
| 5,459,651 | * | 10/1995 | Maehara | 363/34 |
| 5,485,060 | * | 1/1996 | Canova | 315/209 R |
| 5,541,829 | * | 7/1996 | Maehara et al. | 363/34 |
| 5,712,536 | * | 1/1998 | Haas et al. | 363/37 |
| 5,771,159 | * | 6/1998 | Sako et al. | 363/37 |
| 5,798,630 | * | 8/1998 | Sugimori et al. | 363/37 |
| 6,137,234 | * | 10/2000 | Willaert et al. | 363/37 |

* cited by examiner

Primary Examiner—Jeffrey Sterrett

(57) ABSTRACT

In a downconverter for supplying a DC current to a lamp, power feedback is achieved by adding a high frequency-operated switch and a capacitor to the topology. The power factor is improved thereby.

25 Claims, 1 Drawing Sheet

HIGH FREQUENCY DC-DC DOWN CONVERTER WITH POWER FEEDBACK FOR IMPROVED POWER FACTOR

BACKGROUND OF THE INVENTION

This invention relates to a circuit arrangement for supplying a direct current or a low-frequency commutated direct current to a lamp, comprising;
- supply input terminals for connection to the poles of a supply voltage source supplying an alternating current,
- rectifier means coupled to the supply input terminals to rectify the alternating current and provided with a first output terminal and a second output terminal,
- a buffer capacitance coupled to the output terminals of the rectifier means,
- a DC-DC converter of the downconverter type coupled to the buffer capacitance and provided with
  - a first chain which interconnects the output terminals and comprises a series-arrangement of a first circuit element and a first unidirectional element,
  - a first control circuit coupled to the first circuit element to render the first circuit element high-frequency conducting and non-conducting at a frequency f1, and
  - a second chain which shunts the first unidirectional element and comprises a series arrangement of a first inductive element and a first capacitance.

Such a circuit arrangement is well-known. The known circuit arrangement can very suitably be used for supplying a direct current to, for example, a high-pressure discharge lamp. A disadvantage of the known circuit arrangement, however, resides in the fact that current is taken from the supply voltage source almost exclusively when the amplitude of the supply voltage is high. As a result, the power factor of the known circuit arrangement is low.

SUMMARY OF THE INVENTION

It is an object of the invention to provide a circuit arrangement which can suitably be used to supply a direct current to a lamp, the power factor of said circuit arrangement being relatively high.

To achieve this, a circuit arrangement as mentioned in the opening paragraph is characterized in accordance with the invention in that the circuit arrangement is also provided with
- a third chain which comprises a second circuit element and which shunts the first unidirectional element,
- a second control circuit which is coupled to a control electrode of the second circuit element and which serves to render the second circuit element high-frequency conducting and non-conducting at the frequency f1, and
- a fourth chain which shunts the first circuit element and which comprises a series arrangement of a second capacitance and a second unidirectional element, a junction point of the second capacitance and the second unidirectional element being coupled to the first output terminal of the rectifier means.

If the supply input terminals of a circuit arrangement in accordance with the invention are connected to the poles of a supply voltage source, the supplied alternating voltage is rectified by the rectifier means and a first direct voltage is present across the buffer capacitance. The first circuit element is rendered conducting and non-conducting with a frequency f1 by the first control circuit. As a result, the first direct voltage is converted to a second direct voltage of a lower amplitude which is present across the first capacitance. A sequence of 4 successive operating states can be distinguished, which, during operation of the circuit arrangement, are repeated with a frequency f1. In the first operating state, the first circuit element is conducting and the second circuit element is non-conducting, and a current flows from the buffer capacitance through the first circuit element and the first inductive element to the first capacitance. In this first operating state, the amplitude of the current increases. At the end of the first operating state, the first circuit element is rendered non-conducting and the second operating state begins. In the second operating state, the first circuit element is non-conducting and current flows through the first inductive element to the first capacitance. This current decreases in amplitude. A first part of this current flows through the first unidirectional element. A second part of this current flows from the first output terminal of the rectifier means to the second capacitance. The second capacitance is charged by this second part of the current. At a certain moment during the second operating state, the second circuit element is rendered conducting by the second control circuit. As a result, a current flows from the first output terminal of the rectifier means through the second capacitance and the second circuit element. Also this current charges the second capacitance. When the amplitude of the current through the first inductive element has decreased to zero, the third operating state begins. In the third operating state, the first circuit element is non-conducting and the second circuit element is conducting. Under the influence of the direct voltage across the first capacitance, the current in the first inductive element reverses sign. During the third operating state, this current flows from the first capacitance through the first inductive element and through the second circuit element. During the third operating state, the amplitude of this current increases. At the end of the third operating state, the second circuit element is rendered non-conducting by the second control circuit, which marks the beginning of the fourth operating state. During the fourth operating state, both the first and the second circuit element are non-conducting. The current through the first inductive element flows in the same direction as in the third operating state, but the amplitude decreases. The current now flows from the first capacitance through the first inductive element, the second capacitance and the second unidirectional element to the buffer capacitance. This current discharges the second capacitance and charges the buffer capacitance. When the amplitude of the current has decreased to approximately zero, the first circuit element is rendered conducting and the first operating state begins anew. In each sequence of the four operating states, the second capacitance is charged from the supply voltage source. As a result, current is taken from the supply voltage source, even when the momentary amplitude of the supply voltage is lower than the voltage across the buffer capacitance. As a result, it has been achieved with relatively simple means that the power factor of a circuit arrangement in accordance with the invention is relatively high. Although the current through the first inductive element reverses sign during each sequence of the four operating states, the sequence-averaged current through the first inductive element is a direct current.

The fourth chain is additionally provided with preferably a second inductive element. This second inductive element limits the current with which the second capacitance is charged, so that the power dissipation in the second circuit element during charging the second capacitance remains limited.

A second inductive element may also be coupled between the first output terminal of the rectifier means and the second unidirectional element. If the second inductive element is coupled in this manner, it not only limits the charging current of the second capacitance but it also charges the buffer capacitance after the second circuit element has become non-conducting at the beginning of the fourth operating state.

It is possible to incorporate the first unidirectional element in the second circuit element. This is achieved, for example, if the circuit element is embodied so as to be a field effect transistor.

In some cases it is desirable to supply a low-frequency commutated direct current to the lamp. For this purpose, for example a commutator comprising four low-frequency controlled circuit elements may be incorporated in the circuit arrangement. If the lamp voltage is relatively low, two of said circuit elements of the commutator may be replaced by capacitors. Such a current type can also be obtained, however, with a relatively small number of components by embodiments of a circuit arrangement in accordance with the invention, comprising a fifth chain which comprises a series arrangement of a third capacitance and a third unidirectional element and which shunts the second circuit element, a sixth chain which comprises a series arrangement of the first inductive element and a fourth capacitance and which shunts the first circuit element, a seventh chain which comprises a fourth unidirectional element and which shunts the first circuit element, and a circuit part COM which is coupled to the first and the second control circuit for the low-frequency commutation of the direct current at a frequency f0, f0 being smaller than f1.

In this embodiment, the functions of the first and the second circuit element alternate at the same low frequency f0 as the frequency at which the direct current is commutated. Good results are achieved for embodiments wherein the buffer capacitance comprises a first buffer capacitor which forms part of the first capacitance, and a second buffer capacitor which forms part of the fourth capacitance.

These and other aspects of the invention will be apparent from and elucidated with reference to embodiments described hereinafter.

DESCRIPTION OF THE PREFERRED EMBODIMENTS

Figure 1:
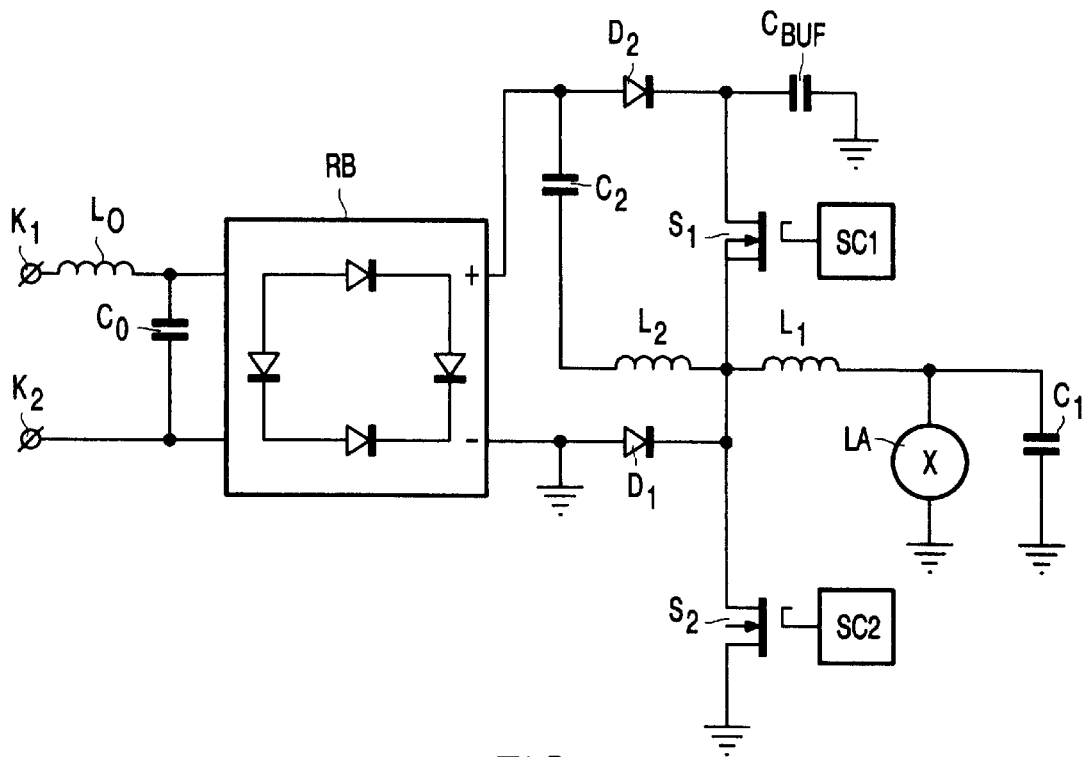
FIG. 1 shows a first example of a circuit arrangement in accordance with the invention, to which a lamp is connected.

In FIG. 1, K1 and K2 are supply input terminals for connection to poles of a supply voltage source supplying an alternating voltage. Supply input terminals K1 and K2 are interconnected by a series arrangement of a coil L0 and a capacitor C0. The coil L0 and the capacitor C0 jointly form a filter. A first side of the capacitor C0 is connected to a first input of diode bridge RB which, in this example, forms rectifier means. A second side of the capacitor C0 is connected to a second input of diode bridge RB. A first output terminal of diode bridge RB is connected to a second output terminal by means of a series arrangement of a capacitor C2, a coil L2 and a diode D1. In this example, the capacitor C2, the coil L2 and the diode D1 form, respectively, a second capacitance, a second inductive element and a first unidirectional element. The series arrangement of the capacitor C2 and the coil L2 is shunted by a series arrangement of the diode D2 and the circuit element S1. The diode D2 and the circuit element S1 form, respectively, a second unidirectional element and a first circuit element. A control electrode of the circuit element S1 is connected to an output of a circuit part SC1 which, in this example, forms a first control circuit. The diode D1 is shunted by the circuit element S2 which, in this example, forms a second circuit element. A control electrode of the circuit element S2 is connected to an output of the circuit part SC2 which forms a second control circuit. The second circuit element is shunted by a series arrangement of a coil L1 and a capacitor C1 which form, respectively, a first inductive element and a first capacitance. The capacitor C1 is shunted by the lamp La. The series arrangement of the first and the second circuit element is shunted by a capacitor Cbuf which, in this example, forms a buffer capacitance. A first chain is formed by the series arrangement of the diode D2, the circuit element S1 and the diode D1. A second chain is formed by the series arrangement of the coil L1 and the capacitor C1. The circuit element S2 forms a third chain, while a fourth chain is formed by the series arrangement of the coil L2, the capacitor C2 and the diode D2.

The operation of the exemplary embodiment shown in FIG. 1 is as follows.

If the supply input terminals K1 and K2 are connected to the poles of a supply voltage source, an alternating voltage supplied by the supply voltage source is rectified by the diode bridge RB and a first direct voltage is present across the buffer capacitance Cbuf. The first control circuit SC1 renders the first circuit element S1 conducting and non-conducting at a frequency f1. As a result, the first direct voltage is converted to a second direct voltage of a lower amplitude which is present across the capacitor C1 and across the lamp. A sequence of 4 successive operating states can be distinguished which, during operation of the circuit arrangement, are repeated at a frequency f1. In the first operating state, the first circuit element S1 is conducting and the second circuit element S2 is non-conducting, and a current flows from the buffer capacitance Cbuf through the first circuit element S1 and the coil L1 to the capacitor C1 and the lamp La. In this first operating state, the amplitude of the current increases. At the end of the first operating state, the first circuit element is rendered non-conducting by the first control circuit SC1 and the second operating state begins. In the second operating state, the first circuit element S1 is non-conducting and current flows through the coil L1 to the capacitor C1 and the lamp La. The amplitude of this current decreases. A first part of this current flows through the diode D1. A second part of this current flows from the first output terminal of the diode bridge RB through capacitor C2 and coil L2. This second part of the current charges the capacitor C2. At a certain moment during the second operating state, the second circuit element S2 is rendered conducting by the second control circuit SC2. As a result, a current flows from the first output terminal of the diode bridge RB through the capacitor C2, the coil L2 and the second circuit element S2. Also this current charges the second capacitance. When the amplitude of the current through the coil L1 has decreased to zero, the third operating state begins. In the third operating state, the first circuit element S1 is non-conducting and the second circuit element S2 is conducting. Under the influence of the second direct voltage across the capacitor C1, the current in the coil L1 reverses sign. During the third operating state, this current flows from the capacitor C1 through the coil L1 and through the second circuit element S2. As this current discharges the capacitor C1 only partly, the voltage across the capacitor C1 and the current through the lamp do not reverse sign. During the third operating state, the amplitude of the current through the coil L1 increases. At the end of the third operating state, the second circuit element S2 is rendered non-conducting by the second control circuit SC2, which marks the beginning of the fourth operating state. During the fourth operating state, both the first circuit element S1 and the second circuit element S2 are non-conducting. The current through the coil L1 flows in the same direction as in the third operating state, but the amplitude decreases. The current now flows from the capacitor C1 through the coil L1, the coil L2, the capacitor C2 and the diode D2 to the buffer capacitance Cbuf. This current discharges the capacitor C2 and charges the buffer capacitance Cbuf. When the amplitude of the current has decreased to approximately zero, the first circuit element S1 is rendered conducting, and the first operating state begins anew. During the third as well as the fourth operating state, the lamp La is fed by means of the voltage across the capacitor C1. In each sequence of the four operating states, the capacitor C2 is charged from the supply voltage source. As a result, current is taken from the supply voltage source, also when the momentary amplitude of the alternating voltage is lower than the voltage across the buffer capacitance. As a result, a relatively high power factor of the circuit arrangement shown in FIG. 1 has been achieved using relatively simple means. Although the current through the coil L1 changes sign in each sequence, a sequence-averaged current flows from the buffer capacitance through the coil L1 to the lamp La.

Figure 2:
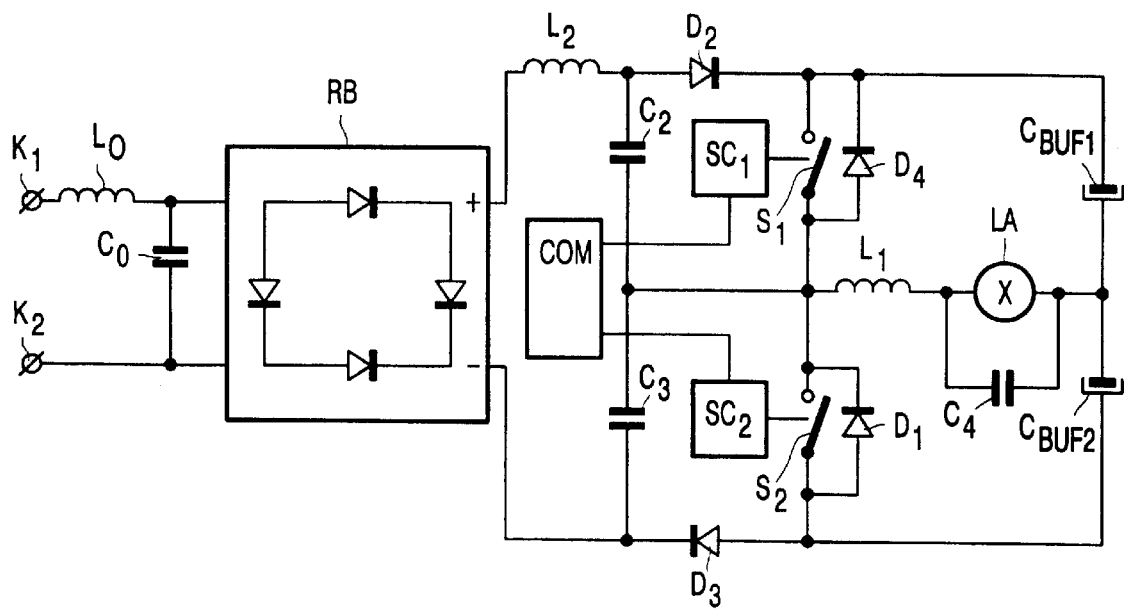
FIG. 2 shows a second example of a circuit arrangement in accordance with the invention, to which a lamp is connected.

The example shown in FIG. 2 can suitably be used to supply a low-frequency commutated direct current to a lamp. In FIG. 2, components and circuit parts which correspond to components and circuit parts shown in the example of FIG. 1 bear the same references. The differences between the example shown in FIG. 2 and the example shown in FIG. 1 are the following. In the example shown in FIG. 2, the coil L2 connects the first output terminal of the diode bridge RB to the anode of the diode D2. The second circuit element S2 is shunted by a series arrangement of the capacitor C3 and the diode D3. The first circuit element is shunted by a diode D4. The buffer capacitance consists of a series arrangement of the capacitor Cbuf1 and the capacitor Cbuf2. A series arrangement of the coil L1 and the lamp La connects a junction point of the first circuit element S1 and the second circuit element S2 to a junction point of the capacitors Cbuf1 and Cbuf2. The lamp La is shunted by a capacitor C4. An input of the first control circuit SC1 is connected to a first output of a circuit part COM for low-frequency commutating, at a frequency f0, the direct current supplied to the lamp La. A second output of the circuit part COM is connected to an input of the second control circuit SC2. A first branch is formed by the series arrangement of the coil L2, the diode D2, the first circuit element S1, the diode D1 and the diode D3. A second branch is formed by the coil L1, the capacitor C4 and the capacitor Cbuf2. The series arrangement of the capacitor C4 and the capacitor Cbuf2 forms a first capacitance. A third branch is formed by the second circuit element S2. A fourth branch is formed by the series arrangement of the capacitor C2 and the diode D2. A fifth branch is formed by the series arrangement of the diode D3 and the capacitor C3 which form, respectively, a third unidirectional element and a third capacitance. A sixth chain is formed by the series arrangement of the coil L1, the capacitor C4 and the capacitor Cbuf1. The series arrangement of the capacitor C4 and the capacitor Cbuf1 forms a fourth capacitance. The diode D4 forms a seventh branch.

The operation of the example shown in FIG. 2 can be described as follows.

In the first half period of the low-frequency commutated direct current, the average current through the coil L1 flows in the direction of the lamp, and the first circuit element serves as a downconverter circuit element. A sequence now comprises the following operating states. The first operating state starts with the first circuit element S1 becoming conducting. As a result, a current flows from the capacitor Cbuf1 through the first circuit element S1, the coil L1 and the parallel arrangement of the capacitor C4 and the lamp L1 back to the capacitor Cbuf1. The amplitude of this current increases during the first operating state. During the first operating state, also the capacitor C3 is charged by means of a current which flows from the first output terminal of the diode bridge RB to the second output terminal of the diode bridge RB through the coil L2, the diode D2, the first circuit element S1 and the capacitor C3. At the end of the first operating state, the first control circuit SC1 renders the first circuit element non-conducting, whereafter the second operating state begins. The current now flows from the coil L1 through the parallel arrangement of the lamp La and the capacitor C4, the capacitor Cbuf2, the diode D3 and the capacitor C3 back to the coil L1. The amplitude of this current decreases. This current causes the capacitor C3 to become discharged and the capacitor Cbuf2 to become charged. When the capacitor C3 is discharged, the current flows via the diode D1 instead of via the diode D3 and the capacitor C3. The second operating state ends as soon as the amplitude of the current through the coil L1 has become zero. At the beginning of the third operating state, the second circuit element S2 is rendered conducting. During the third operating state, the second circuit element S2 is conducting and the first circuit element S1 is non-conducting. The capacitor C2 is charged by a current which flows from the first output terminal of the diode bridge RB to the second output terminal of the diode bridge RB through the coil L2, the capacitor C2, the second circuit element S2 and the diode D3. In addition, under the influence of the voltage across the capacitor Cbuf2, a current flows from the capacitor Cbuf2 through the parallel arrangement of the lamp La and the capacitor C4, the coil L1 and the second circuit element S2 back to the capacitor Cbuf2. The amplitude of this current increases. At the end of the third operating state, the second circuit element S2 is rendered non-conducting, whereafter the fourth operating state begins, in which operating state both the first and the second circuit element are non-conducting. In this fourth operating state, a current flows from the coil L2, through the diode D2, the capacitor Cbuf1, the capacitor Cbuf2, the diode D3 and the diode bridge RB back to the coil L2. This current charges the capacitors Cbuf1 and Cbuf2, its amplitude decreases and it flows until the energy stored in the coil L2 has become zero. In addition, a current flows from the coil L1 through the capacitor C2, the diode D2, the capacitor Cbuf1 and the parallel arrangement of the lamp La and the capacitor C4 back to the coil L1. This current has a decreasing amplitude, and it discharges the capacitor C2 and charges the capacitor Cbuf1. When the capacitor C2 is discharged, the current flows via the diode D4 instead of via the capacitor C2 and the diode D2. At the end of the fourth operating state, the first circuit element S1 is rendered conducting and the first operating state starts anew. Although the current through the coil L1 changes direction during each sequence of the first half period of the low-frequency commutated direct current, the sequence-averaged current through the coil L1 is a direct current in the direction of the lamp La. During the third and the fourth operating state, the voltage across the capacitor C4 is supplied to the lamp La. Since the current through the coil L1 during the third and the fourth operating state only partly discharges the capacitor C4, the lamp current, unlike the current through the coil L1, does not reverse direction.

At the end of the first half period of the low-frequency commutated direct current, the circuit part COM changes the control of the first and the second circuit element in such a manner that the second circuit element starts acting as a downconverter circuit element. As a result, the direction of the average current through the coil L1 and the lamp La is reversed. During the second half period of the low-frequency commutated direct current, the average current through the coil L1 flows in the direction of the second circuit element S2. A sequence now includes the following operating states. The first operating state begins with the second circuit element S2 becoming conducting. As a result, a current flows from the capacitor Cbuf2 through the parallel arrangement of the lamp La and the capacitor C4, the coil L1 and the circuit element S2 back to the capacitor Cbuf2. The amplitude of this current increases during the first operating state. During the first operating state, also the capacitor C2 is charged by means of a current which flows from the first output terminal of the diode bridge RB to the second output terminal of the diode bridge RB through the coil L2, the capacitor C2, the second circuit element S2 and the diode D3. At the end of the first operating state, the second control circuit SC2 renders the second circuit element non-conducting, whereafter the second operating state begins. The current now flows from the coil L1 through the capacitor C2, the diode D2 and the capacitor Cbuf1 and through the parallel arrangement of the lamp La and the capacitor C4 back to the coil L1. The amplitude of this current decreases. This current causes the capacitor C2 to become discharged and the capacitor Cbuf1 to become charged. As soon as the amplitude of the current through the coil L1 has become zero, the second operating state ends. At the beginning of the third operating state, the first circuit element S1 is rendered conducting. During the third operating state, the first circuit element S1 is conducting and the second circuit element S2 is non-conducting. The capacitor C3 is charged by a current which flows from the first output terminal of the diode bridge RB through the coil L2, the diode D2, the circuit element S1 and the capacitor C3 to the second output terminal of the diode bridge RB. Under the influence of the voltage across the capacitor Cbuf1, also a current flows from the capacitor Cbuf1 through the first circuit element S1, the coil L1 and the parallel arrangement of the lamp La and the capacitor C4 back to the capacitor Cbuf1. The amplitude of this current increases. At the end of the third operating state, the first circuit element is rendered non-conducting, whereafter the fourth operating state begins wherein both the first and the second circuit element are non-conducting. In this third operating state, a current flows from the coil L2 through the diode D2, the capacitor Cbuf1, the capacitor Cbuf2, the diode D3 and the diode bridge RB back to the coil L2. This current charges the capacitors Cbuf1 and Cbuf2, its amplitude decreases and it flows until the energy stored in the coil L2 has become zero. A current also flows from the coil L1 through the parallel arrangement of the lamp La and the capacitor C4, the capacitor Cbuf2, the diode D3 and the capacitor C3 back to the coil L1. This current has a decreasing amplitude and it discharges the capacitor C3 and it charges the capacitor Cbuf2. At the end of the fourth operating state, the second circuit element S2 is rendered conducting, and the first operating state begins anew. Although the current through the coil L1 changes direction during each sequence of the second half period of the low-frequency commutated direct current, the sequence-averaged current through the coil L1 is a direct current in the direction of a junction point of the first and the second circuit element. During the third and the fourth operating state, the voltage across the capacitor C4 is supplied to the lamp La. Since the current through the coil L1 during the third and the fourth operating state only partly discharges the capacitor C4, the lamp current, unlike the current through coil L1, does not reverse direction. The voltage across the capacitor C4 does reverse sign when the transition to a subsequent half period of the low-frequency commutated direct current takes place. In practice, f0 generally is of the order of 10 Hz, and f1 is of the order of 10 kHz.

What is claimed is:

1. A circuit arrangement for supplying a direct current or a low-frequency commutated direct current to a lamp, comprising:

supply input terminals for connection to the poles of a supply voltage source supplying an alternating current, rectifier means coupled to the supply input terminals to rectify the alternating current and provided with a first output terminal and a second output terminal, a buffer capacitance coupled to the output terminals of the rectifier means, a DC-DC converter of the downconverter type coupled to the buffer capacitance and provided with a first chain coupled to the output terminals and comprises a series-arrangement of a first circuit element and a first unidirectional element, a first control circuit coupled to the first circuit element to render the first circuit element high-frequency conducting and non-conducting at a frequency f1, a second chain coupled across the first unidirectional element and comprises a series arrangement of a first inductive element and a first capacitance, characterized in that the circuit arrangement is also provided with a third chain which comprises a second circuit element and which shunts the first unidirectional element, a second control circuit which is coupled to a control electrode of the second circuit element and which serves to render the second circuit element high-frequency conducting and non-conducting at a frequency f1, a fourth chain which shunts the first circuit element and which comprises a series arrangement of a second capacitance and a second unidirectional element, a junction point of the second capacitance and a first terminal of the second unidirectional element being coupled to the first output terminal of the rectifier means wherein a second terminal of the second unidirectional element is coupled to the first chain, and the circuit arrangement includes a lamp connection terminal connected so that a direct current is made to flow through a lamp when connected to said lamp connection terminal.

2. A circuit arrangement as claimed in claim 1, wherein the fourth chain further includes a second inductive element.

3. A circuit arrangement as in claim 1, wherein a second inductive element is coupled between the first output terminal of the rectifier means and the first terminal of the second unidirectional element.

4. A circuit arrangement as claimed in claim 1, wherein the first unidirectional element forms a part of the second circuit element.

5. A circuit arrangement as claimed in claim 1, comprising:
- a fifth chain which comprises a series arrangement of a third capacitance and a third unidirectional element and which shunts the second circuit element,
- a sixth chain which comprises a series arrangement of the first inductive element and a fourth capacitance and which shunts the first circuit element,
- a seventh chain which comprises a fourth unidirectional element and which shunts the first circuit element, and
- a circuit part which is coupled to the first and the second control circuit for the low-frequency commutation of the direct current at a frequency f0, f0 being smaller than f1.

6. A circuit arrangement as claimed in claim 5, wherein the buffer capacitance comprises a first buffer capacitor which forms a part of the first capacitance, and a second buffer capacitor which forms a part of the fourth capacitance.

7. A circuit arrangement as claimed in claim 1 wherein the lamp connection terminal is connected to a circuit point between the first inductive element and the first capacitance and with a connected lamp in parallel with the first capacitance.

8. A circuit for supplying a direct current to a discharge lamp comprising:
- input terminals for connection to a low frequency AC supply voltage source,
- rectifier means coupled to the input terminals and having first and second DC output terminals,
- a buffer capacitance coupled to the first and second DC output terminals,
- a DC-DC down converter coupled to the first and second DC output terminals and the buffer capacitance, the DC-DC down converter comprising;
  - a first series circuit coupled to the first and second DC output terminals and which includes first and second controlled switching elements,
  - a second series circuit coupled to the first and second DC output terminals and which includes the first controlled switching element and a first unidirectional element,
  - a third series circuit coupled across the first unidirectional element and comprises a first inductive element and a first capacitance,
  - a fourth series circuit which shunts the first controlled switching element and which comprises a second capacitance and a second unidirectional element and with a circuit point between the second capacitance and a first terminal of the second unidirectional element coupled to the first DC output terminal wherein a second terminal of the second unidirectional element is coupled to the first chain, and
  - control circuit means coupled to respective control electrodes of the first and second controlled switching elements for switching same alternately on and off at a high frequency f1 so that a direct current will flow through a lamp when connected to the supply circuit.

9. The direct current lamp supply circuit as claimed in claim 8 wherein the control circuit means produces a first operating state of the circuit when the first controlled switching element is on and the second controlled switching element is off and a current flows via a path from the buffer capacitance through the first controlled switching element and the first inductive element to the first capacitance independent of the second capacitance.

10. The direct current lamp supply circuit as claimed in claim 9 wherein the control circuit means produces a second operating state of the circuit when the first controlled switching element is off and a first decreasing current flows through the first inductive element to the first capacitance and the discharge lamp via the first unidirectional element and a second current flows from the first DC output terminal through the second capacitance and the first inductive element to the first capacitance and to a connected discharge lamp to thereby charge the second capacitance.

11. The direct current lamp supply circuit as claimed in claim 10 wherein the control circuit means produces a third operating state of the circuit when the first controlled switching element is off and the second controlled switching element is on and a current flows via a path from the first capacitance through the first unidirectional element and the second controlled switching element.

12. The direct current lamp supply circuit as claimed in claim 11 wherein the control circuit means produces a fourth operating state when the first and second controlled switching elements are both off and a current flows from the first capacitance to the buffer capacitance via a series path including the first inductive element, the second capacitance and the second unidirectional element, thereby to charge the buffer capacitance and discharge the second capacitance.

13. The direct current lamp supply circuit as claimed in claim 12 wherein the supply voltage source applies a charge current to the second capacitance in each of the four operating states of the lamp supply circuit.

14. The direct current lamp supply circuit as claimed in claim 12 wherein, during the third and fourth operating states, the discharge lamp is energized by a voltage on the first capacitance.

15. The direct current lamp supply circuit as claimed in claim 10 wherein during an initial part of the second operating state, the first and second controlled switching elements are both off, and during the remainder of the second operating state, the first controlled switching element remains off and the second control switching element is on, whereby a current flows from the first DC output terminal through the second capacitance and the second controlled switching element.

16. The direct current lamp supply circuit as claimed in claim 8 wherein the fourth series circuit further comprises a second inductive element.

17. The direct current lamp supply circuit as claimed in claim 8 further comprising a second inductive element coupled between the first DC output terminal and the first terminal of the second unidirectional element.

18. The direct current lamp supply circuit as claimed in claim 17 wherein the second inductive element forms a series circuit with the second unidirectional element and the buffer capacitance across the first and second DC output terminals and forms a further series circuit with the second capacitance, the first inductive element and the first capacitance coupled across said first and second DC output terminals.

19. The direct current lamp supply circuit as claimed in claim 17 wherein a discharge lamp is adapted to be coupled in parallel with the first capacitance, a further unidirectional element is in parallel with the first control switching element, and further comprising;

means coupled to the control circuit means for the low-frequency commutation of the direct current at a frequency f0 which is lower than the frequency f1.

20. The direct current lamp supply circuit as claimed in claim 8 wherein the second controlled switching element is coupled in shunt with the first unidirectional element.

21. The direct current lamp supply circuit as claimed in claim 8 wherein the third series circuit shunts the first unidirectional element independently of a discharge lamp when said lamp is connected to the supply circuit.

22. The direct current lamp supply circuit as claimed in claim 8 wherein the fourth series circuit shunts the first controlled switching element but not the second controlled switching element.

23. The direct current lamp supply circuit as claimed in claim 8 wherein the fourth series circuit further comprises a second inductive element connected such that the second capacitance and the second inductive element form a series circuit with the third series circuit coupled across the first and second DC output terminals, a further series circuit with the second controlled switching element across the first and second DC output terminals, and a still further series circuit with the first unidirectional element across the first and second DC output terminals.

24. The direct current lamp supply circuit as claimed in claim 8 wherein the third series circuit is in parallel with the second controlled switching element and is in series with the second capacitance across the first and second DC output terminals, and a discharge lamp, when connected to said supply circuit, is in parallel with the first capacitance.

25. The direct current lamp supply circuit as claimed in claim 24 wherein the first unidirectional element is oppositely polarized relative to a DC voltage at the first and second DC output terminals.

* * * * *

UNITED STATES PATENT AND TRADEMARK OFFICE
CERTIFICATE OF CORRECTION

PATENT NO. : 6,310,790 B1
DATED : October 30, 2001
INVENTOR(S) : Hendrix et al.

It is certified that error appears in the above-identified patent and that said Letters Patent is hereby corrected as shown below:

Claim 1,
Line 32, delete "a first terminal of" after "and";
Line 33, delete "wherein a second terminal of the second unidirectional element is coupled to the first chain";

Claim 3,
Line 2, delete "the first terminal of" after "and";

Claim 8,
Line 24, delete "a first terminal of" after "and"
Line 25, delete "wherein a second terminal of the second unidirectional element is coupled to the first chain";

Claim 9,
Line 3, change "when" to -- where --;

Claim 10,
Line 3, change "when" to -- where --;

Claim 11,
Line 3, change "when" to -- where --;

Claim 12,
Line 3, change "state when" to -- circuit where --;

Claim 17,
Line 3, delete "the first terminal of" after "and";

Signed and Sealed this

Twenty-sixth Day of February, 2002

Attest:

JAMES E. ROGAN
Attesting Officer    Director of the United States Patent and Trademark Office